(12) United States Patent
Seaman et al.

(10) Patent No.: US 10,338,588 B2
(45) Date of Patent: Jul. 2, 2019

(54) CONTROLLING ACCESS TO COMPARTMENTS OF A CARGO TRANSPORTATION UNIT

(71) Applicant: BlackBerry Limited, Waterloo (CA)

(72) Inventors: Conrad Delbert Seaman, Guelph (CA); Stephen West, Manotick (CA); Prabhul Dev, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 134 days.

(21) Appl. No.: 15/388,491

(22) Filed: Dec. 22, 2016

(65) Prior Publication Data
US 2018/0181126 A1 Jun. 28, 2018

(51) Int. Cl.
| | |
|---|---|
| G05D 1/00 | (2006.01) |
| G05D 1/02 | (2006.01) |
| G07C 9/00 | (2006.01) |
| B60R 25/01 | (2013.01) |
| G06Q 10/08 | (2012.01) |

(52) U.S. Cl.
CPC .......... G05D 1/0088 (2013.01); B60R 25/01 (2013.01); G05D 1/0011 (2013.01); G05D 1/0212 (2013.01); G05D 1/0291 (2013.01); G06Q 10/08355 (2013.01); G07C 9/00174 (2013.01); G07C 9/00571 (2013.01); G07C 2009/0092 (2013.01)

(58) Field of Classification Search
CPC .. G05D 1/0088; G05D 1/0011; G05D 1/0212; G05D 1/0291; B60R 25/01
See application file for complete search history.

(56) References Cited

U.S. PATENT DOCUMENTS

| | | | |
|---|---|---|---|
| 3,412,876 A | 11/1968 | Calabrese | |
| 4,780,043 A | 10/1988 | Fenner et al. | |
| 5,015,145 A | 5/1991 | Angell et al. | |
| 6,290,277 B1 | 9/2001 | Spykerman et al. | |
| 8,123,281 B2 | 2/2012 | Perkins et al. | |
| 9,811,796 B2 | 11/2017 | Ogilvie et al. | |
| 2004/0069850 A1 | 4/2004 | De Wilde | |
| 2011/0084162 A1 | 4/2011 | Goossen et al. | |
| 2014/0222298 A1 | 8/2014 | Gurin | |
| 2015/0006005 A1 | 1/2015 | Yu et al. | |
| 2018/0024554 A1* | 1/2018 | Brady | G05D 1/0088 |

(Continued)

OTHER PUBLICATIONS

ISA/CA, Canadian Intellectual Property Office, International Search Report and Written Opinion for PCT/CA2017/051556 dated Feb. 27, 2018 (8 pages).

(Continued)

*Primary Examiner* — Michael D Lang
(74) *Attorney, Agent, or Firm* — Trop, Pruner & Hu, P.C.

(57) ABSTRACT

In some examples, a controller directs transport of a cargo transportation unit (CTU) to a plurality of pickup locations or a plurality of destination locations in response to requests of a plurality of requesters. The controller controls access to a plurality of compartments in the CTU, wherein controlling the access comprises selecting respective compartments of the plurality of compartments in which to place cargo items for the requests, the selecting based on characteristics of the cargo items and characteristics of the respective compartments.

24 Claims, 5 Drawing Sheets

(56) References Cited

U.S. PATENT DOCUMENTS

2018/0144300 A1* 5/2018 Wiechers ........... G06Q 10/0836

OTHER PUBLICATIONS www.autoflexsuspensions.com/autoflex/—Auto Flex—Air Ride Suspension System dated on or before Nov. 13, 2016 (2 pages).
VSE—Dynamic Truck and Trailer Suspension DTS Suspension, Advanced Steering & Suspension Solutions, Version 2009 (24 pages).
www.kudauk.ltd.uk/shop/truck-aerodynamics/lasereye-auto-spoiler-adjustment—LaserEye, Automatic Truck Spoiler, Roof Deflector Adjustment System dated on or before Nov. 13, 2016 (7 pages).
www.psitireinflation.com/how-atis-works—P.S.I. The Inflation System—How Automatic Tire Inflation Systems Work, 2015 (2 pages).
www.truckingefficiency.org/tire-pressure-inflation-trailer—Tire Pressure Inflation Systems (Trailers) dated on or before Nov. 13, 2016 (11 pages).
Dronelife News, 5 Reasons Drones Will Change the Future of Cargo, Aug. 11, 2014 (9 pages).
Insurance Journal, First Licensed Autonomous Freight Truck Hits the Road in U.S., May 6, 2015 (8 pages).
Petersen, Ryan, Crunch Network, The driverless truck is coming, and it's going to automate millions of jobs, Apr. 25, 2016 (12 pages).
www.platformuca.org/—The Platform for Unmanned Cargo Aircraft (PUCA), 2016 (2 pages).
Seaman et al., U.S. Appl. No. 15/388,479 entitled Adjusting Mechanical Elements of Cargo Transportation Units filed Dec. 22, 2016 (31 pages).
Seaman et al., U.S. Appl. No. 15/254,654 entitled Improving Efficiency of a Cargo Shipping System filed Sep. 1, 2016 (51 pages).

* cited by examiner

CONTROLLING ACCESS TO COMPARTMENTS OF A CARGO TRANSPORTATION UNIT

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route.

BRIEF DESCRIPTION OF THE DRAWINGS

Some implementations of the present disclosure are described with respect to the following figures.

DETAILED DESCRIPTION

Figure 1:
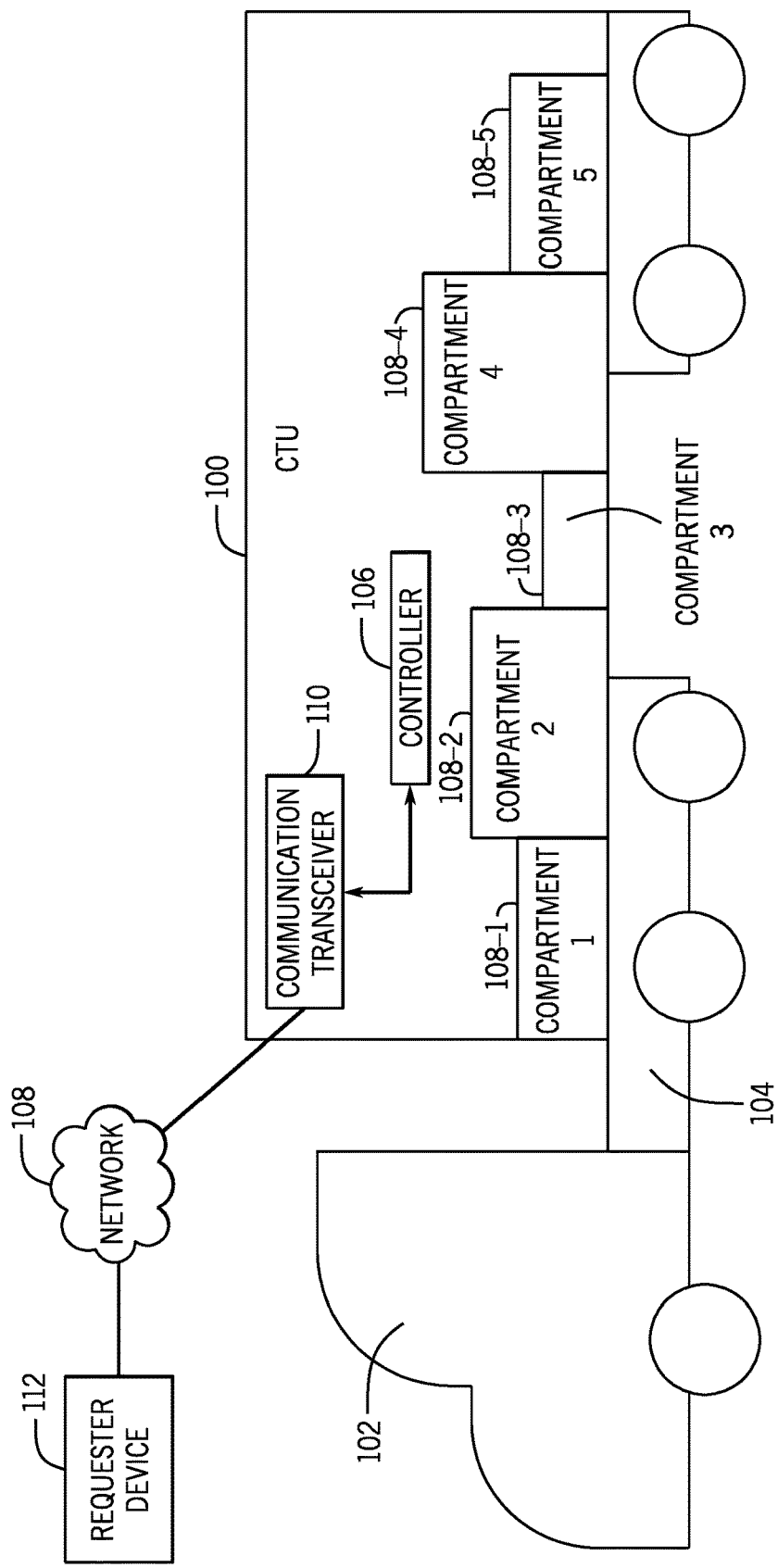
FIG. 1 is a block diagram of an example arrangement including a cargo transportation unit (CTU) and a vehicle attached to the CTU, according to some implementations.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) in the form of a moveable platform can be used to carry cargo items between different geographic locations. A "cargo item" can refer to any physical item that is to be delivered from one location to another location. "Cargo" can refer to one or more cargo items. In some examples, a CTU can be a container (that is attached to a tractor), a cargo carrying portion of a truck, or a trailer, where the container provides an enclosed space in which the physical items can be stored during shipment. In other examples, the CTU can include another type of carrier structure that is able to carry cargo items. More generally, the CTU can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth. The vehicle can haul the CTU that is part of, mounted on, or attached to the vehicle.

In some examples, a vehicle to which a CTU is attached to, mounted on, or part of, can be a driverless vehicle that can be self-driving. A driverless vehicle refers to a vehicle that is without a driver, i.e., a human that controls the movement of the vehicle while the driver is located on the vehicle. A self-driving vehicle has the intelligence and self-awareness to perform driving tasks, including driving itself from an origin to a destination, without any human driver on the vehicle.

When using driverless vehicles, the drop-off and/or pickup of cargo items (the "last mile of deliveries") can present various issues. For example, there may not be a person to deliver the package to the doorstep of the recipient, or alternatively, there may not be a person to help load a cargo item onto the CTU. Moreover, when the CTU is to carry cargo items for multiple senders and/or recipients (where senders and/or recipients can generally be referred to as "tenants"), securing the cargo items to prevent theft or unauthorized access can also pose an issue. Additionally, a CTU can include multiple compartments of different characteristics (e.g., different sizes, different abilities to hold fragile or perishable cargo items, etc.), such that management of loading of different cargo items into the different compartments has to be performed. Also, when a CTU is used to transport cargo items to different recipients at different locations, the CTU may take a sub-optimal route that leads to inefficiencies.

In accordance with some implementations of the present disclosure, a controller is provided to manage access of a CTU to manage placement of cargo items in compartments of the CTU, to secure the storage of the cargo items in the CTU, and to select a more optimal route (based on one or more predefined criteria) of the CTU based on the cargo items carried by the CTU.

In the ensuing discussion, reference is made to example implementations where CTUs are moved by driverless vehicles. In other examples, CTUs can be moved by vehicles driven by human drivers.

FIG. 1 illustrates a CTU 100 that is towed by a vehicle 102 (such as a tractor or other type of vehicle). In examples according to FIG. 1, the CTU 100 is separate from the vehicle 102, and the CTU 100 can be attached to a tow platform 106 of the vehicle 102 to allow the vehicle 102 to tow the CTU 100. In other examples, the vehicle 102 can be a truck, and the CTU 100 can be part of the truck. In further examples, the vehicle 102 can have a support structure on which the CTU 100 is placed.

In some examples, the CTU 100 includes a controller 106 that is able to perform various management tasks as discussed in the present disclosure. The controller 106 can include a hardware processing circuit which can include any one or more of the following: a microprocessor, a core of a multi-core multiprocessor, a microcontroller, a programmable gate array, a programmable integrated circuit device, or another type of hardware processing circuit. In further examples, the controller 106 can include a combination of a hardware processing circuit and machine-readable instructions (software or firmware) executable on the hardware processing circuit.

The CTU 100 includes multiple compartments 108-1, 108-2, 108-3, 108-4, and 108-5. Although a specific number of compartments are shown in FIG. 1, it is noted that in other examples, a different number of compartments can be present in the CTU 100. A "compartment" of the CTU 100 refers to any identifiable space (separated by a partition, for example) in the CTU 100 that can be used to store a specific cargo item (or a group of cargo items). In some cases, a compartment can have an access cover that is moveable between an open position (to allow access to the inner chamber of the compartment) and a closed position (to secure the inner chamber of the compartment). In some examples, the access cover can have a lock that can be actuated to lock the access cover to secure the compartment. In further examples, some compartments do not have access covers, but rather can have at least one side that is open to the inside of the CTU 100.

The CTU 100 can be used to carry cargo items of a single requester or of multiple requesters. A "requester" can refer to any entity (a human, a machine, a software application, etc.) that is able to request that a specific cargo item (or group of cargo items) be transported from an origin to a destination.

In examples where there are multiple requesters that have requested the transport of cargo items by the CTU 100, the different compartments 108-1 to 108-5 of the CTU 100 can be used to store cargo items for the different requesters. For example, a first compartment can be used to store cargo item(s) for a first requester, a second compartment can be used to store cargo item(s) for a second requester, and so forth.

The controller 106 is able to control access to the multiple compartments 108-1 to 108-5 in the CTU 100, where controlling the access includes selecting respective compartments of the multiple compartments 108-1 to 108-5 in which to place corresponding cargo items for requests received from requesters. The selecting of compartments to store respective cargo items can be based on characteristics of the cargo items and characteristics of the respective compartments.

The characteristics of cargo items can be any or some combination selected from among: a size of a cargo item, a type of a cargo item, a weight of a cargo item, a fragility of the cargo item (e.g., a measure can be provided to indicate how fragile the cargo item is, such as fragile, not fragile, or some level of fragileness), a perishable status of a cargo item (e.g., an amount of time before the cargo item may perish, such as spoliation of fruits or vegetables, expiration of medicines or food items, etc.), an origin of a cargo item, a destination of a cargo item, and so forth.

The characteristics of compartments of the CTU 100 can include any or some combination selected from among: a size of a compartment, a type of cargo items that a compartment can accommodate, a location of a compartment within the CTU 100, an air conditioning capability of a compartment (i.e., whether the compartment is capable of being heated or cooled), a shock absorption capability of a compartment (i.e., whether the compartment is attached to a shock absorbing element to protect the content of the compartment from shock), and so forth.

Although the controller 106 is shown as being part of the CTU 100 in examples according to FIG. 1, it is noted that in other examples, the controller 106 can be part of the vehicle 102 (and in communication with components of the CTU 100), or alternatively, the controller 106 can be a remote controller that is able to communicate with the CTU 100 over a network 108. The CTU 100 includes a communication transceiver 110 that is able to communicate with the network 108. The communication transceiver 110 is able to transmit and receive information for the network 108, which can be a wireless network.

In some examples, the network 108 can include a cellular network, a wireless local area network (WLAN), or any other type of wireless network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by the controller 108 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

As noted above, the controller 106 can receive requests for transporting cargo items from requesters. In FIG. 1, a requester device 112 is shown coupled to the network 108. The requester device 112 can include any type of computing device, such as any or some combination of the following: a desktop computer, a notebook computer, a tablet computer, a smartphone, a wearable device (e.g., a smart watch, smart eyeglasses, a head-mounted device, etc.), or any other type of electronic device that a requester can use to send a request to the controller 106 to request transport of a cargo item (or a group of cargo items) from an origin to a destination. In some examples, characteristics of a cargo item(s) can be entered by the requester for submission with the request. Alternatively, the requester can take a picture of the cargo item, and the controller 106 can determine the characteristics (e.g., size, type, weight, special needs, etc.) of the cargo item based on the picture of the cargo item, by performing image processing of the picture.

Although one requester device 112 is shown in FIG. 1, it is noted that in other examples, multiple requester devices 112 can be coupled to the network 108 to send requests to transport cargo items to the controller 106. In response to the requests received from the requester device(s) 112 to transport cargo item, the controller 106 is able to direct transport of the CTU to multiple pickup locations and/or multiple destination locations. For example, in response to a request to transport a given cargo item, the controller 106 can direct the transport of the CTU 100 to a respective pickup location to pick up the given cargo item. The controller 106 can cause the vehicle 102 to move the CTU 100 to the respective pickup location.

The controller 106 is able to direct the CTU 100 to a point of exchange (drop-off of a cargo item or pickup of a cargo item) anywhere a person can meet the CTU 100 to perform the exchange. For example, a requester can direct the CTU 100 to drop off at an office location, at a home location, at a mall, or at any other location depending on which is more convenient. Also, in the context where there is a fleet of multiple CTUs capable of transporting cargo items for requesters, a selected CTU of the fleet of CTUs can be used to satisfy requests from the requesters.

In response to a request to transport the given cargo item, the controller 106 can select one of the compartments 108-1 to 108-5 to store the given cargo item, based on comparing characteristics of the given cargo item with characteristics of the compartments 108-1 to 108-5.

For example, the given cargo item may be large, so that the controller 106 selects a compartment that has a size large enough to accommodate the given cargo item. As another example, the given cargo item may be perishable and thus should be protected with heat or cooling—in such case, the controller 106 selects a compartment with an air conditioning capability. As a further example, the destination of the given cargo item is far from the origin and thus likely to be one of the last cargo items to be delivered—in such case, the controller 106 selects a compartment that is farther away from the door of the CTU 100 so that access to cargo items that are likely to be dropped off earlier can be placed closer to the door of the CTU 100 for easier access. In further examples, other characteristics of cargo items and compartments can be used for selecting compartments to store respective cargo items.

At the pickup location (an origin for the pickup of cargo item(s) for transport to a destination), the controller 106 can unlock (without input from any human driver) the selected compartment(s), and can direct the requester, or other person who is dropping off the cargo item(s), to the selected compartment(s). For example, the controller 106 can send a message to the requester device 112, or another device of the person dropping off the cargo item(s), informing the requester, or other drop-off person, that the cargo item(s) is (are) to be stored in the selected compartment(s). Each compartment of the CTU 100 can have an identifier. The message sent to the device of the person dropping of the cargo item(s) can include the identifier(s) of the selected compartment(s), so that the person can load the cargo item(s) into the identified compartment(s). An identifier of a compartment can include a number, a name (e.g., a string of alphanumeric characters), or any other distinguishing mark that is recognizable by the person dropping off the cargo item(s). The message sent to the device of the drop-off person can also include a secure token that allows the drop-off person to unlock the selected compartment(s). A discussion of secure tokens is provided further below.

In other examples, instead of sending a message to the device of the drop-off person, the CTU 100 can have a display that displays the identifier(s) of the selected compartment(s) in which the drop-off person is to place the cargo item(s).

In yet further examples, each compartment can have a light indicator that lights up (such as to a given color) to direct the drop-off person to the selected compartment(s). In alternative examples, the CTU 100 can be equipped with a speaker that can provide an audio announcement to direct the drop-off person to the selected compartment(s).

Once the drop-off person has loaded the cargo item(s) into the selected compartment(s), the controller 106 can cause locking of the selected compartment(s) to secure the cargo item(s), in examples where the selected compartment(s) is (are) equipped with an access cover and a lock. By locking a cargo item within a selected compartment, unauthorized retrieval of the cargo item, such as by another drop-off person at another pickup location or by a person picking up a cargo item(s) at a destination, is prevented.

Assuming that the CTU 100 has received more requests for transport of cargo items, the controller 106 can direct the transport of the CTU 100 to other pickup locations to pick up additional cargo items, and to select additional compartments for storing the other cargo items.

More generally, once the controller 106 has directed the transport of the CTU 100 to a particular pickup location (origin) to pick up a particular cargo item, the controller 106 can provide access to a compartment of the multiple compartments 108-1 to 108-5, based on the characteristics of the particular cargo item and the characteristics of the compartment.

Once all cargo items of received requests have been picked up, the controller 106 can direct the transport of the CTU 100 to respective destination locations, where the cargo items are to be dropped off. There can be just one destination location to which the cargo items are to be delivered, or there can be multiple destination locations. At each respective destination location, the controller 106 can cause unlocking of the respective compartment(s), and can send a message to a person that is picking up the cargo item(s), where the message includes an identifier of the compartment(s) containing the cargo item(s) to be picked up. The person at the destination location can then go to the identify compartment(s) and remove the cargo item(s) from the identified compartment(s). In other examples, instead of sending a message to the device of the pickup person, the CTU 100 can include a display to direct the pickup person to the identified compartment(s), activate a light indicator of the identified compartment(s), or provide an audio announcement of the identified compartment(s). In further examples, a secure token can be sent to a device of the person picking up cargo item(s) from the CTU 100 to allow the person to unlock the identified compartment(s). Secure tokens are discussed further below.

Figure 2:
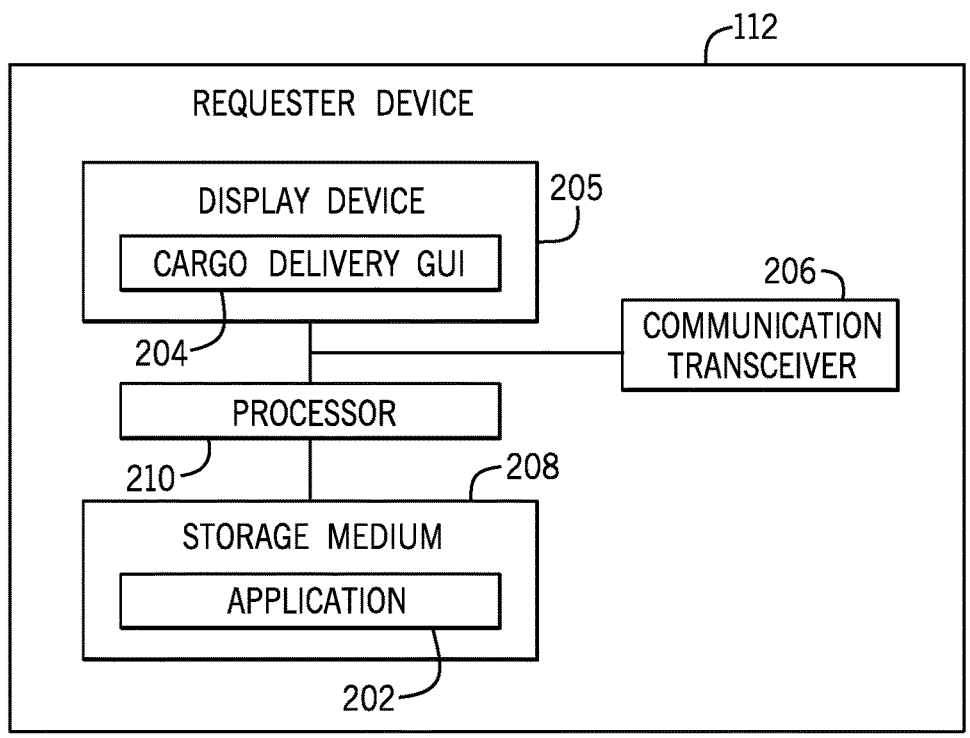
FIG. 2 is a block diagram of a requester device according to some examples.

FIG. 2 shows an example of the requester device 112 that can be used to request transport, by a CTU such as the CTU 100, of cargo item(s) from an origin to a destination. In some examples, the requester device 112 can download an application 202 that can be executed in the requester device 112 and which is able to present a cargo delivery graphical user interface (GUI) 204 according to some implementations to allow a user to submit requests to transport cargo items using the CTU 100. The cargo delivery GUI 204 can be displayed by a display device 205 of the requester device 112. Alternatively, the application 202 can include a web browser that allows the user of the requester device 112 to browse to a website, to cause display of a web page that presents the cargo delivery GUI 204.

The cargo delivery GUI 204 includes control items (e.g., control menus, control buttons, text fields, etc.) that can be selected by the user or in which the user can enter information to generate a request to transport a cargo item. This request is transmitted by a communication transceiver 206 of the requester device 112 over a network (e.g., the network 108 of FIG. 1) to the CTU 100.

The application 202 can be stored in a non-transitory machine-readable or computer-readable storage medium 208, and can be executed by a processor (or multiple processors) 210.

In further examples confirmation of delivery and security can be accomplished by providing the device of the person picking up a cargo item with a capability to scan barcodes, QR codes, or other uniquely identifying indicia (more generally, "cargo codes"). For example, the device can include a camera and a scan application that is able to capture and recognize cargo codes. The device can also be provided with a secure token.

When the person picking up the cargo item arrives at the CTU, the person uses the secure token to unlock the appropriate compartment on the CTU. The person also confirms delivery by capturing an image of a cargo code (e.g., barcode QR code, or other unique identifying indicia).

Similarly, when a person drops off a cargo item for transport at the CTU, the drop-off person can capture an image of the cargo code as part of placing the cargo item into the corresponding compartment.

Using the combination of the cargo code capture and the secure token, a chain of trust is created, since it can be confirmed that an authorized person with an appropriate secure token dropped off the cargo item, and that another authorized person with an appropriate secure token picked up the cargo item. Depending upon which of the foregoing tasks were not properly taken, recourse can be made to the corresponding entity when a requested cargo item fails to reach its intended recipient.

Figure 3:
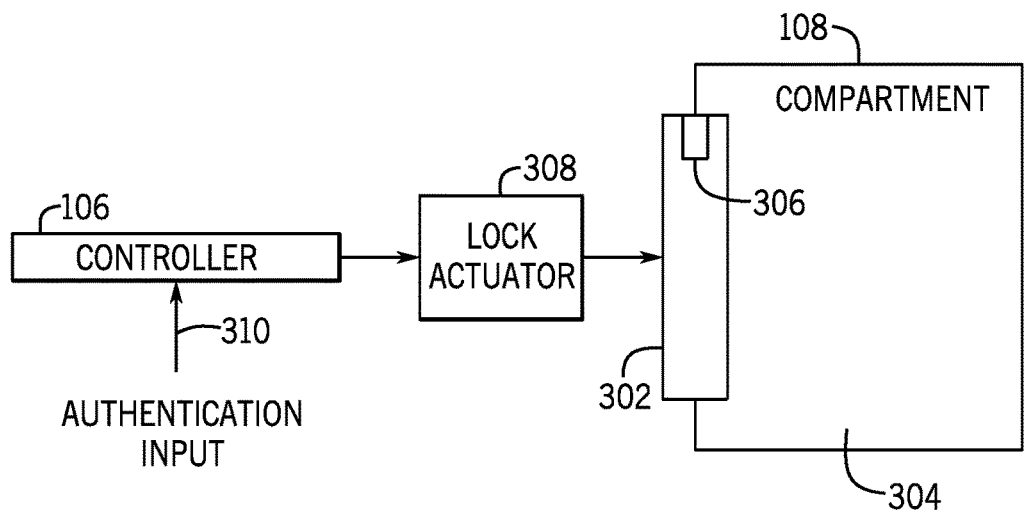
FIG. 3 is a block diagram of a lock control assembly according to some examples.

FIG. 3 is a block diagram of an example arrangement that includes the controller 106 and a compartment 108. The compartment 108 can be any of the compartments 108-1 to 108-5 of FIG. 1. The compartment 108 has an access cover 302 that can be moved between an open position (to allow access from outside the compartment 108 to an inner chamber 304 of the compartment 108) and a closed position (to secure the inner chamber 304 of the compartment 108). The access cover 302 has a lock 306. The lock 306 can be actuated to a locked position to lock the access cover 302 to the main housing of the compartment 108, to prevent unauthorized access of cargo item(s) stored in the compartment 108. The lock 306 can also be actuated to an unlocked position to allow the access cover 302 to be opened to access to the inner chamber 304 of the compartment 108, such as to place cargo item(s) into the inner chamber 304, or to remove cargo item(s) from the inner chamber 304.

The controller 106 controls a lock actuator 308, which is able to actuate the lock 306 between the locked position and the unlocked position. The compartment 108 can be locked and/or unlocked independently of another compartment.

In some examples, the lock actuator 308 can include solenoid elements that can be energized to move the lock 306 between the locked position and the unlocked position. In other examples, the lock actuator 308 can include other types of actuating elements to control the state of the lock 306. The controller 106 can send a control signal to the lock actuator 308 to cause the lock actuator to actuate the lock 306 between the locked position or the unlocked state.

In some examples, the controller 106 can receive an authentication input 310 to lock or unlock the compartment 108. The authentication input 310 can be based on one or more input information, including as examples, a location of the CTU 100 and information identifying an authorized person who is dropping off cargo item(s) at an origin or picking up cargo item(s) at a destination.

The location of the CTU 100 can be based on information from a location sensor. The location sensor can include a Global Positioning System (GPS) receiver that determines a location based on communication with GPS satellites. Alternatively, the location sensor can determine a location based on triangulation of signals received by a communication transceiver (e.g., the communication transceiver 110 in FIG. 1) from multiple wireless base stations or wireless access points that have known positions.

Information identifying an authorized person can be based on a secure token carried by the authorized person. The secure token can be in the form of authentication information stored by an electronic device (e.g., a smartphone, a radio frequency identification or RFID tag, a smart card, etc.). As examples, the authentication information can include a username and password, or a personal identification code, or some other type of information that is unique to the authorized person or otherwise indicates that the authorized person is permitted to access a compartment of the CTU 100.

The secure token is provided to the person dropping off or picking up cargo item(s) so that the person can use the secure token (a digital key) to unlock a compartment (or compartments). Secure tokens can be shared through a trusted resource and can be part of the buying/selling process. For example, if a buyer buys something on an online retailer, the online retailer can provide the buyer with the secure token to obtain the purchased product(s) from a CTU that delivers the purchased product(s). As another example, a seller of product(s) who has sold the product(s) on an online website can be provided with a secure token to allow the seller to drop off the sold product(s) on a CTU.

When the user shows up at the CTU 100 to take drop off or pick up cargo item(s), the user can provide the authentication information to the controller 106, such as by activating the electronic device to send the authentication information to the controller 106, such as over a wireless link, e.g., a Bluetooth link, a Wi-Fi link, an infrared link, etc. Alternatively, the user can place the electronic device in proximity to a sensor pad of the controller 106, such as to enable Near Field Communication (NFC) between the electronic device and the sensor pad, so that the authentication information stored in the electronic device can be communicated to the controller 106.

In other examples, the user can type in the authentication information on an input device (e.g., a keypad or keyboard) available at the CTU 100.

Once a valid authentication input 310 is received by the controller 106, the controller 106 can send a signal to the lock actuator 308 to lock the compartment 108 or unlock the compartment 108. A valid authentication input 310 is detected by the controller 106 in response to the controller 106 determining that the CTU 100 is at a specified location and/or determining that received authentication information matches specified authentication information.

Figure 4:
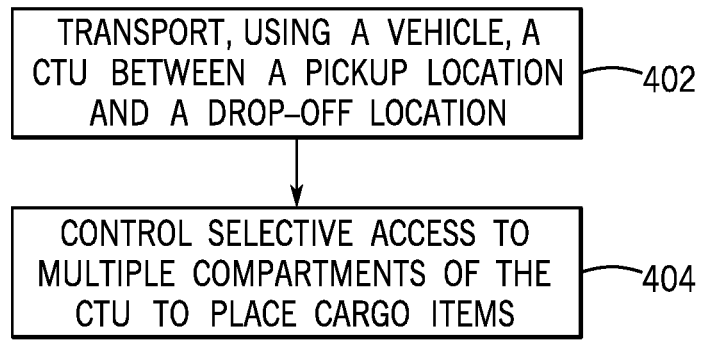
FIG. 4 is a flow diagram of a process of transporting a CTU and controlling selective access to compartments of the CTU, according to some examples.

FIG. 4 is a flow diagram of a process according to some examples. The process includes transporting (at 402), using a vehicle (a driverless vehicle or a vehicle driven by a human driver), a CTU between a pickup location (an origin) and a drop-off location (a destination). In addition, a controller (e.g., the controller 106 of FIG. 1) can control (at 404) selective access to multiple compartments in the CTU, where controlling the selective access includes selecting respective compartments of the multiple compartments in which to place cargo items, where the selecting is based on characteristics of the cargo items and characteristics of the compartments.

Figure 5:
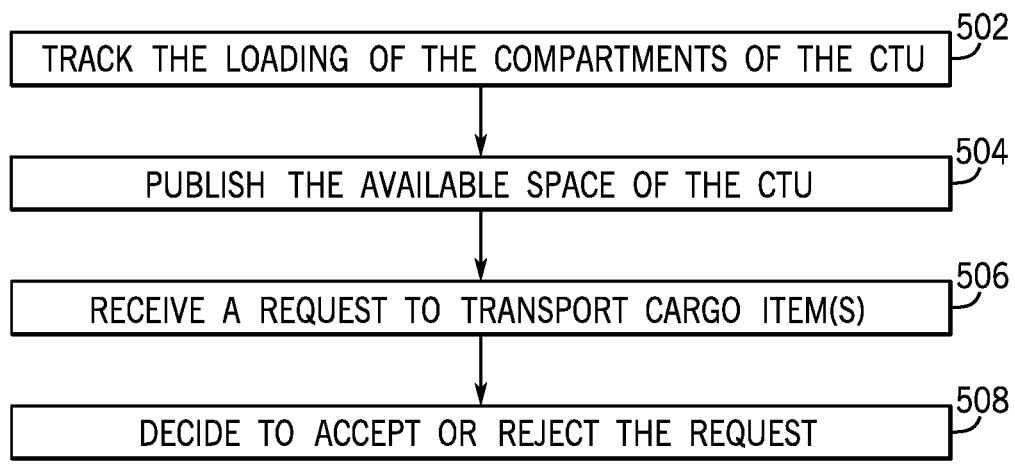
FIG. 5 is a flow diagram of a process of tracking available compartments and accepting or denying a transport request, according to further examples.

In some implementations, as shown in FIG. 5, the controller 106 can track (at 502) the loading of the CTU 100, such that the controller 106 is aware of which compartments are filled with cargo items and which other compartments are still available to carry cargo items. As cargo items are placed into compartments, sensors in the compartments can send indications to the controller 106 that the compartments have been filled with cargo items.

The controller 106 can publish (at 504) the available space of the CTU to a service that allows for such available space to be communicated to potential requesters. The service can be implemented as software executed on one or more computers, such as server computers or computers of a cloud. In some examples, the service can be accessed using the application 202 (FIG. 2) executed in the requester device 112. The cargo delivery GUI 204 presented by the requester device 112 (FIG. 2) can be used to provide an indication of the available space. For example, the available space can be indicated as a list of available compartments (along with the characteristics of such compartments), or the available space can be indicated as a percentage of space available.

The controller 106 can receive (at 506) a request to transport cargo item(s), such as through the cargo delivery GUI 204 (FIG. 2) or through some other mechanism through which a request can be submitted. The controller 106 can decide (at 508) whether to accept or reject the request, based on characteristics pertaining to the cargo item(s) of the request, and characteristics of available compartments in the CTU 100. For example, if the request specifies that a cargo item of a certain size is to be transported, and the controller 106 determines that the available compartments are all too small to accommodate the cargo item, then the controller 106 can reject the request. More generally, the controller 106 can reject the request in response to determining that there are no available compartments with characteristics to accommodate the cargo item(s) of the request. On the other hand, the controller 106 can accept the request in response to determining that there is an available compartment (or available compartments) with characteristics that can accommodate the cargo item(s) of the request. Other factors that may be considered in accepting or rejecting a request can include user requirements for loading/unloading a cargo item. The user may, for example, request a low compartment for heavy items—if such a low compartment is not available, then the request can be rejected. Alternatively, machinery may be used for loading and unloading that may have requirements for the compartment size and/or location. In such cases, the user and/or machinery may make a submission with the request for preferred or mandatory requirements for the compartments, which may factor in to the decisions to accept or reject a request to transport cargo item(s).

Figure 6:
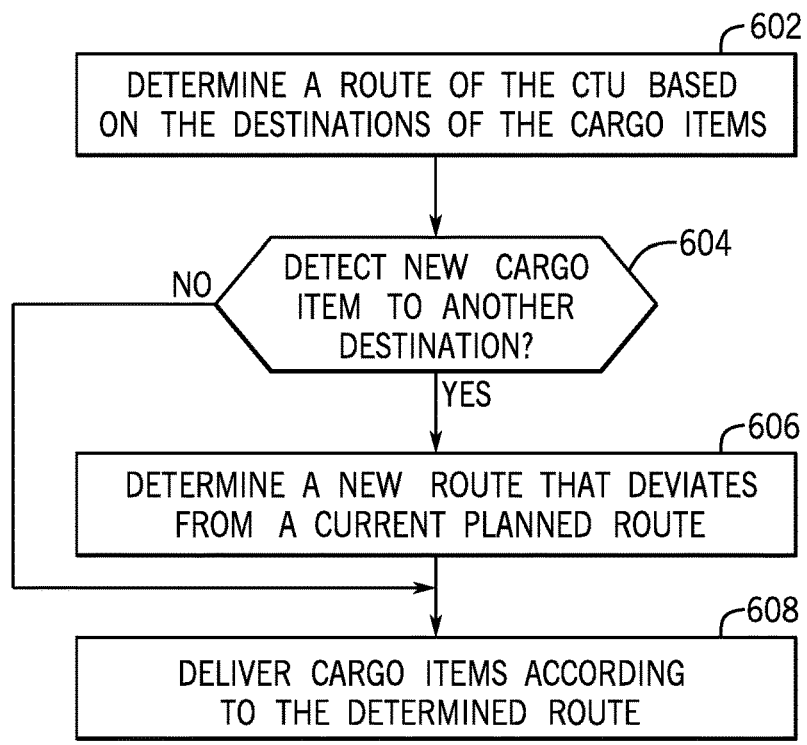
FIG. 6 is a flow diagram of a process of determining routes of a CTU, according to additional examples.

As shown in FIG. 6, in accordance with some examples, the controller 106 is able to determine (at 602) a route of the CTU 100, based on the destinations of the cargo items that are being transported by the CTU 100. The determining of the route by the controller 106 can be based on one or more factors selected from among reducing a distance traveled by the CTU 100, increasing an amount of loading of the CTU 100, and reducing an amount of time to deliver cargo items. The route determined by the controller 106 based on the current cargo items stored in the CTU 100 can be referred to as a current planned route.

It is possible that after the controller 106 has determined the current planned route, the CTU 100 may receive another cargo item to be delivered to another destination. In response to detecting (at 604) receipt of a new cargo item after a current planned route has been determined, the controller 106 can determine (at 606) a new route that deviates from the current planned route.

The CTU 100 then delivers (at 608) the cargo items according to the determined route (either the route determined at 602 or the route determined at 606).

The controller 106 can provide intermittent or continual status updates regarding the cargo items during transport by the CTU 100. Thus, using the application 202 of the requester device 112, the requester is able to see (using information presented in the cargo item GUI 204 (FIG. 2) a current status of the transport of the requested cargo items(s) for the requester, such as a current location of the CTU 100 or an estimated time of arrival of the requested cargo item(s).

Figure 7:
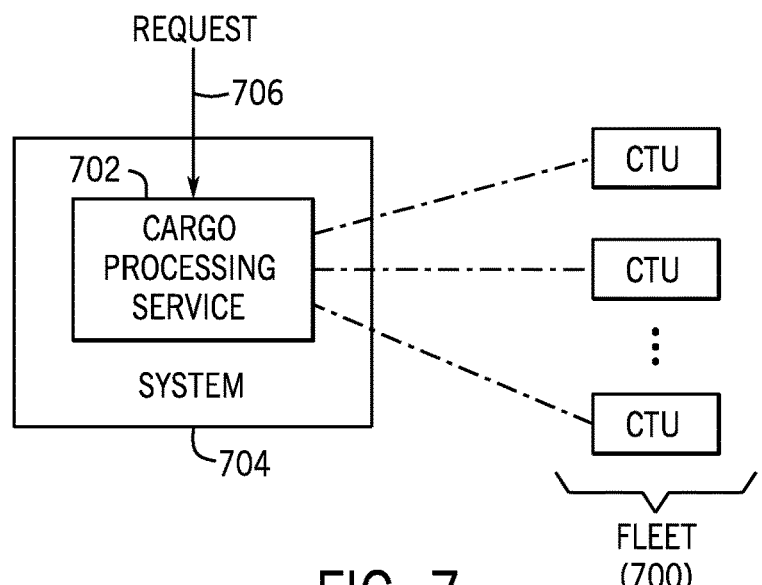
FIG. 7 is a block diagram of an arrangement including a cargo processing service to select from among a fleet of CTUs, according to alternative examples.

The foregoing refers to examples where the controller 106 associated with a CTU 100 can determine whether or not to accept a request for transport of cargo item(s). In other examples, as shown in FIG. 7, an arrangement can include a fleet 700 of CTUs. A cargo processing service 702 executed in a system 704 (including one or more computers) can be used to select a CTU from among the fleet of CTUs to satisfy a request 706 to transport cargo item(s).

The cargo processing service 702, which can be implemented with software, can receive the request 706, such as from a requester device (e.g., 112 in FIG. 1). The cargo processing service 702 is also able to communicate with the controllers (e.g., 106) of the CTUs in the fleet 700, to determine the load status and available compartments of the CTUs, as well as characteristics of the available CTUs.

The selection of a CTU from multiple CTUs to satisfy a transport request can be based on or more factors, such as a load status of a CTU (e.g., what percentage of the available compartments are filled), characteristics of the available compartments, distance of a CTU to the pickup location, the destinations of other cargo items carried by a CTU, and so forth. For example, a given CTU can be selected from among the multiple CTUs of the fleet 700 in response to determining that the given CTU has sufficient capacity to accommodate the number of cargo items in the request, and that the available compartments have characteristics that can accommodate the cargo items to be transported. Also, the cargo processing service 702 can select a CTU that is closer to a pickup location, or a CTU carrying cargo items that are closer to the destination of the requested cargo items.

Figure 8:
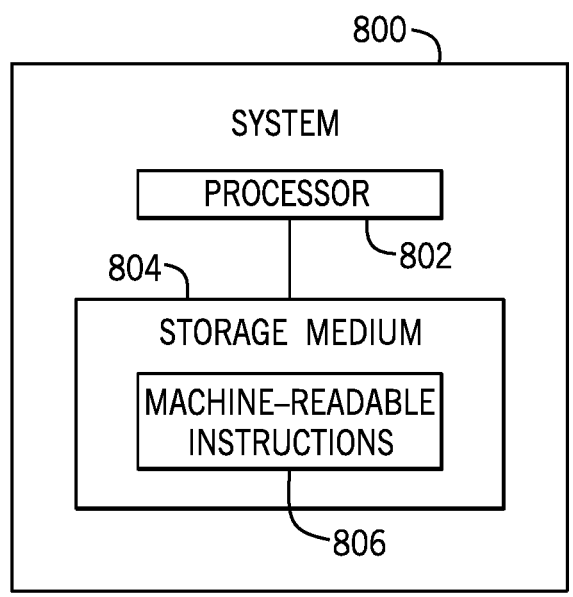
FIG. 8 is a block diagram of a system according to some examples.

FIG. 8 is a block diagram of a system 800, which can be the controller 106 of FIG. 1 or the system 704 of FIG. 7. The system 800 includes a processor (or multiple processors) 802, and a non-transitory machine-readable or computer-readable storage medium 804 that stores machine-readable instructions 806 (such as instructions executed by the controller 106 or the cargo processing service 702). The machine-readable instructions 806 are executable by the processor(s) 802 to perform various tasks as discussed in the present disclosure.

The storage medium 208 (FIG. 2) or 804 (FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
at least one processor configured to:
direct transport of a cargo transportation unit (CTU) to a plurality of pickup locations or a plurality of destination locations in response to requests of a plurality of requesters; and
control access to a plurality of compartments in the CTU, wherein controlling the access comprises selecting respective compartments of the plurality of compartments in which to place cargo items for the requests, and the at least one processor is configured to select a first compartment of the plurality of compartments for a first cargo item of the cargo items based on a first characteristic of the first compartment and a first characteristic of the first cargo item, and select a second compartment of the plurality of compartments for a second cargo item of the cargo items based on a second characteristic of the second compartment and a second characteristic of the second cargo item, the second characteristic of the second compartment different from the first characteristic of the first compartment, and the second characteristic of the second cargo item different from the first characteristic of the first cargo item, wherein the first and second characteristics of the first and second cargo items are selected from among one or more of a type of a cargo item, a weight of a cargo item, a fragility of a cargo item, and a perishable status of a cargo item, and wherein the first and second characteristics of the first and second compartments are selected from among one or more of a type of cargo items that a compartment can accommodate, an air conditioning capability of a compartment, and a shock absorption capability of a compartment.

2. The controller of claim 1, wherein the directing comprises directing transport of the CTU to a first pickup location to pick up the first cargo item, the at least one processor configured to further:
provide, at the first pickup location, access to the first compartment of the plurality of compartments based on the first characteristic of the first cargo item and the first characteristic of the first compartment.

3. The controller of claim 2, wherein providing the access to the first compartment comprises controlling unlocking, by the controller, of the first compartment independently of another compartment of the plurality of compartments to place the first cargo item in the unlocked first compartment, the at least one processor configured to further:
lock the first compartment independently of the another compartment after the first cargo item has been placed in the first compartment.

4. The controller of claim 2, wherein the directing comprises directing transport of the CTU to a first destination location for the first cargo item, the at least one processor configured to further:
provide, at the first destination location, access to the first compartment to allow removal of the first cargo item from the first compartment.

5. The controller of claim 1, wherein the at least one processor is configured to further:
determine a route of the CTU based on the cargo items placed in the respective compartments.

6. The controller of claim 5, wherein the determining of the route of the CTU comprises deviating the CTU from a planned route responsive to adding a cargo item to a compartment of the plurality of compartments.

7. The controller of claim 5, wherein the determining of the route of the CTU is based on increasing an amount of loading of cargo items in the CTU.

8. The controller of claim 1, wherein the at least one processor is configured to:
track available compartments of the CTU, the available compartments not loaded with cargo items; and
communicate, over a network, information identifying the available compartments of the plurality of compartment.

9. The controller of claim 8, wherein the information identifying the available compartments communicated by the at least one processor over the network comprises a list of the available compartments.

10. The controller of claim 1, wherein the at least one processor is configured to further:
provide access to a selected compartment of the plurality of compartments based on an authentication input that is selected from among a current location of the CTU or authentication information of a user.

11. The controller of claim 1, wherein the at least one processor is configured to:
direct the transport of the CTU using a driverless vehicle.

12. The controller of claim 1, wherein the at least one processor is configured to:
use a secure token and a captured image of a cargo code of a given cargo item to confirm one or more of dropping off the given cargo item in a given compartment of the CTU, or picking up the given cargo item from the given compartment of the CTU.

13. A controller comprising:
at least one processor configured to:
direct transport of a cargo transportation unit (CTU) to a plurality of pickup locations or a plurality of destination locations in response to requests of a plurality of requesters;
control access to a plurality of compartments in the CTU, wherein controlling the access comprises selecting respective compartments of the plurality of compartments in which to place cargo items for the requests, the selecting based on characteristics of the cargo items and characteristics of the respective compartments, wherein the characteristics of the cargo items are selected from among one or more of a type of a cargo item, a weight of a cargo item, a fragility of a cargo item, and a perishable status of a cargo item, and wherein the characteristics of the compartments are selected from among one or more of a type of cargo items that a compartment can accommodate, an air conditioning capability of a compartment, and a shock absorption capability of a compartment;
track available compartments of the CTU; and
communicate, over a network, information identifying the available compartments of the plurality of compartments.

14. The controller of claim 13, wherein the at least one processor is configured to further:
receive a request to deliver a first cargo item; and
determine whether or not to accept the request based on the available compartments of the CTU, the available compartments of the CTU comprising compartments not loaded with cargo items.

15. The controller of claim 14, wherein the controller is part of the CTU or is remote from the CTU.

16. The controller of claim 13, wherein the at least one processor is configured to:
   determine a first pickup location in response to a request from a requester; and
   direct transport of the CTU to the first pickup location to receive a cargo item for the request.

17. The controller of claim 16, wherein the at least one processor is configured to:
   unlock, without input from a driver, a compartment of the plurality of compartments of the CTU to receive the cargo item, while maintaining another compartment of the plurality of compartments locked.

18. The controller of claim 13, wherein the at least one processor is configured to:
   determine a current route of the CTU based on destinations of the cargo items carried by the CTU; and
   in response to detecting a new cargo item added to the CTU, modify a route of the CTU from the current route to deliver the new cargo item to a destination of the new cargo item.

19. The controller of claim 13, wherein the information identifying the available compartments communicated by the at least one processor over the network comprises a list of the available compartments.

20. A non-transitory storage medium storing instructions that upon execution cause a system to:
   direct transport of a cargo transportation unit (CTU) to a plurality of pickup locations or a plurality of destination locations in response to requests of a plurality of requesters; and
   control access to a plurality of compartments in the CTU, wherein controlling the access comprises selecting respective compartments of the plurality of compartments in which to place cargo items for the requests, the selecting based on characteristics of the cargo items and characteristics of the respective compartments and the selecting comprising selecting a first compartment of the plurality of compartments for a first cargo item of the cargo items based on a first characteristic of the first compartment and a first characteristic of the first cargo item, and selecting a second compartment of the plurality of compartments for a second cargo item of the cargo items based on a second characteristic of the second compartment and a second characteristic of the second cargo item, the second characteristic of the second compartment different from the first characteristic of the first compartment, and the second characteristic of the second cargo item different from the first characteristic of the first cargo item, wherein the first and second characteristics of the first and second cargo items are selected from among one or more of a type of a cargo item, a weight of a cargo item, a fragility of a cargo item, and a perishable status of a cargo item, and wherein the first and second characteristics of the first and second compartments are selected from among one or more of a type of cargo items that a compartment can accommodate, an air conditioning capability of a compartment, and a shock absorption capability of a compartment.

21. The non-transitory storage medium of claim 20, wherein the CTU is part of a fleet of CTUs, and wherein the instructions upon execution cause the system to select, by a service, the CTU from the fleet of CTUs to process a request to deliver a cargo item.

22. The non-transitory storage medium of claim 20, wherein controlling the access comprises independently unlocking and locking individual compartments of the plurality of compartments.

23. The non-transitory storage medium of claim 20, wherein the instructions upon execution cause the system to:
   track available compartments of the CTU, the available compartments not loaded with cargo items; and
   communicate, over a network, information identifying the available compartments of the plurality of compartments.

24. The non-transitory storage medium of claim 23, wherein the information identifying the available compartments communicated by the controller over the network comprises a list of the available compartments.

* * * * *